US008607262B2

(12) United States Patent
Hallberg

(10) Patent No.: US 8,607,262 B2
(45) Date of Patent: Dec. 10, 2013

(54) METHOD AND APPARATUS FOR COMMUNICATING POPULARITY RATINGS TO USERS

(75) Inventor: Bryan S. Hallberg, Vancouver, WA (US)

(73) Assignee: Sharp Laboratories of America, Camas, WA (US)

( * ) Notice: Subject to any disclaimer, the term of this patent is extended or adjusted under 35 U.S.C. 154(b) by 995 days.

(21) Appl. No.: 11/382,665

(22) Filed: May 10, 2006

(65) Prior Publication Data

US 2007/0266401 A1    Nov. 15, 2007

(51) Int. Cl.
| | |
|---|---|
| H04H 60/33 | (2008.01) |
| H04H 60/32 | (2008.01) |
| G06F 3/00 | (2006.01) |
| G06F 13/00 | (2006.01) |
| H04N 5/445 | (2011.01) |

(52) U.S. Cl.
USPC ......... 725/14; 725/9; 725/40; 725/46; 725/50

(58) Field of Classification Search
USPC .................. 725/9–21, 37, 40, 46, 50
See application file for complete search history.

(56) References Cited

U.S. PATENT DOCUMENTS

| | | | | |
|---|---|---|---|---|
| 5,758,257 | A * | 5/1998 | Herz et al. ........................ 725/46 |
| 6,295,092 | B1 * | 9/2001 | Hullinger et al. ............... 725/20 |
| 6,637,029 | B1 * | 10/2003 | Maissel et al. ................... 725/46 |
| 7,003,790 | B1 * | 2/2006 | Inoue et al. ....................... 725/10 |
| 7,478,414 | B1 * | 1/2009 | Glusker et al. ..................... 725/9 |
| 2002/0112239 | A1 * | 8/2002 | Goldman .......................... 725/46 |
| 2002/0120925 | A1 * | 8/2002 | Logan ................................. 725/9 |
| 2002/0124248 | A1 * | 9/2002 | Matey .............................. 725/22 |
| 2003/0023967 | A1 * | 1/2003 | Kim ................................... 725/9 |
| 2003/0061611 | A1 * | 3/2003 | Pendakur ......................... 725/46 |
| 2003/0066074 | A1 * | 4/2003 | Zimmerman et al. .......... 725/14 |
| 2003/0101451 | A1 * | 5/2003 | Bentolila et al. .................. 725/9 |
| 2004/0068737 | A1 * | 4/2004 | Itoh et al. ......................... 725/14 |
| 2005/0022239 | A1 * | 1/2005 | Meuleman ...................... 725/34 |
| 2005/0071863 | A1 | 3/2005 | Matz |
| 2005/0149964 | A1 * | 7/2005 | Thomas et al. .................... 725/9 |
| 2005/0235307 | A1 * | 10/2005 | Relan et al. ........................ 725/9 |
| 2005/0283792 | A1 | 12/2005 | Swix |
| 2006/0010464 | A1 | 1/2006 | Azami |
| 2006/0015891 | A1 * | 1/2006 | Lazzaro et al. .................... 725/9 |
| 2007/0061833 | A1 * | 3/2007 | Deng ............................... 725/18 |
| 2007/0136753 | A1 * | 6/2007 | Bovenschulte et al. ......... 725/46 |

OTHER PUBLICATIONS

U.S. Appl. No. 09/567,474, filed May 2000, Glusker et al.*

* cited by examiner

Primary Examiner — Pankaj Kumar
Assistant Examiner — Randy Flynn
(74) Attorney, Agent, or Firm — Stolowitz Ford Cowger LLP

(57) ABSTRACT

A method of providing popularity ratings to users includes monitoring experiences of users with programs, generating popularity ratings associated with the programs in response to the monitoring, and communicating at least one of the popularity ratings as at least one of the users experiences at least one of the programs.

27 Claims, 3 Drawing Sheets

METHOD AND APPARATUS FOR COMMUNICATING POPULARITY RATINGS TO USERS

BACKGROUND

People enjoy discussions of their activities with other people. In particular, people enjoy discussing television programs with other people. As a result of such interaction, a person feels more connected to social groups. To be able to comment on a particular television program, a person may need to view the television program. However, if a program that a person views is not the program that was viewed by others in the person's social group, that person may feel excluded from the social group. For example, if Bob thinks that his colleagues are all watching reruns of "Friends", he may watch a broadcast of "Friends" to be able to discuss the episode the next day. Unfortunately, if his colleagues are all watching a "Doctor Who" marathon, Bob will be unable to discuss "Doctor Who", causing Bob to feel isolated from and rejected by his colleagues.

Popularity ratings of television programs are available. However, the popularity ratings may not be available until a day after the program is broadcast or later. As a result, a person cannot determine the most popular television programs currently being watched by other people. Unfortunately, after such a delay, the viewing opportunities for the indicated popular television programs have passed, so the person will not be able to watch the popular programs and later discuss them with others. In addition, in order to obtain the popularity ratings, a person must search through magazines, newspapers, or the internet. As a result, a person does not have immediate access to the popularity ratings.

Thus, there remains a need for an improved technique of communicating popularity ratings.

SUMMARY

An embodiment includes a method of providing popularity ratings to users including monitoring experiences of users with programs, generating popularity ratings associated with the programs in response to the monitoring, and communicating at least one of the popularity ratings as at least one of the users experiences at least one of the programs.

Another embodiment includes a system for providing popularity ratings to users including devices to provide programs to users and to generate user experience data, a server to generate popularity ratings associated with the programs in response to the user experience data, and a popularity rating interface to provide popularity ratings to at least one of the users from the server.

A further embodiment includes a device including a program presenter to present a program to a user of the device, a popularity rating interface to provide popularity ratings to the user, the popularity ratings indicating the popularity of multiple programs among multiple users, and a network connection to connect the device to a popularity database to store the popularity ratings.

DETAILED DESCRIPTION

As used in this description, program refers to any content that a user may sense or experience. For example, an episode of television show is a program. The user or viewer of the television show may both watch and listen to the television show. Another example is a Braille interface to an internet website. Thus, the user may experience the content through touch. A radio broadcast and a music CD are other examples of programs. Any such content communicated to a user through a combination of the user's senses may be referred to as a program.

As used in this description, an experience of a user with a program refers to the perception of or interaction with the program by the user. For example, an experience may include a length of time that a user watches a television program. In addition, an experience may include a user's selection or termination of a program. Any such interaction, perception, or combination of interaction and perception of a program, in any manner, may be referred to as the experience of the program.

Furthermore, an experience associated with a program may include interaction or perception by the user both before and after the program is presented to the user. For example, a user changing the function of an audio receiver to experience surround sound before selecting a program that offers surround sound may be included in the experience of the user with that program.

Popularity ratings, as used in this discussion, are associated with programs. However, a popularity rating need not be associated with only one program. For example, one popularity rating may indicate the popularity of only a single program. Another popularity rating may indicate the popularity of a group of programs including the single program.

Furthermore, a popularity rating need not be associated with an entire program. For example, a popularity rating may be associated with each quarter of a football game with yet another popularity rating for the half time show. Thus, popularity ratings may indicate the popularity of anything associated with a program from a small aspect of a program to the popularity of the entire universe of programs.

In addition, popularity ratings may be associated with a group of programs. For example, one popularity rating may include the popularity of all day time talk show programs.

Figure 1:
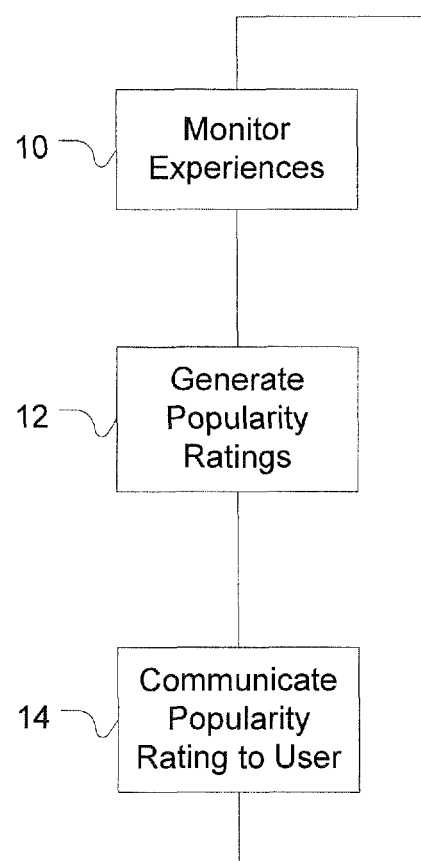
FIG. 1 is a flowchart of an embodiment of a method of providing popularity ratings to users.

FIG. 1 is a flowchart of an embodiment of a method of providing popularity ratings to users. In 10, the experiences of multiple users with multiple programs are monitored. The monitoring may be real time measurements gathered from the users in any manner. Such monitoring may occur in a variety of ways that indicate that a user is experiencing a program.

For example, parameters of a device presenting a program may be monitored. Various parameters of a device may be monitored to affect the popularity ratings. For example, audio or video control changes may indicate a change in interest of a user that may be used to change associated popularity ratings. If a user increases volume while experiencing a particular program, it may indicate a greater degree of interest. Similarly, if a user adjusts a video control such as the brightness or the displayed aspect ratio, the user's interest in the program may have changed. Furthermore, program controls such as play, pause, fast forward, rewind, skip, slow, etc, may all be used to monitor the experience of the user. Any such parameter of the device that the user may modify may indicate a change in the interest of the user, and consequently a change in associated popularity ratings.

In 12, multiple popularity ratings associated with the programs are generated in response to the monitoring in 10. The monitored experiences of the users are combined into the popularity ratings. For example, if a user tunes into a crime drama program such as "Law and Order", many popularity ratings may be generated or modified. The "Law and Order" popularity rating may be increased. The crime drama popularity rating may be increased. The popularity rating for the time slot occupied by "Law and Order" may be increased. Any associated popularity rating may be modified. Similarly, if the user tunes to a different program, the popularity ratings associated with the previous program may be reduced.

The popularity ratings generated in 12 are then communicated to users in 14. The popularity rating may be communicated to the user at various time periods. In particular, the popularity rating may be communicated to the user as that popularity rating is updated. Thus, the user would be made aware of the changes in the popularity rating almost immediately. Thus, the popularity rating is communicated to the user as at least one user is experiencing at least one of the programs.

The popularity rating may be communicated to the user in various ways. For example, an audible alert may inform the user that a popularity rating is available. The audible alert may also be as simple as a beep, or may include a voice stating popularity ratings. Popularity ratings may be communicated to the user through a variety of lists, graphs, charts, or other visual aids. For example, popularity ratings may be displayed as a ticker moving across a display. In addition, any number of popularity ratings may be communicated in any kind of grouping.

Furthermore, the popularity ratings may be communicated to the user as a result of a user input or may be communicated automatically. For example, a user may press a "Display Popularity Ratings" button on a remote control to request communication of the popularity ratings. Alternatively, a device presenting a program to the user may automatically cycle through groups, lists, or individual popularity ratings.

Although particular methods of communicating popularity ratings have been described, one of ordinary skill in the art will understand that any method that would communicate information to the user may be used. Furthermore, any of the methods may be combined together to inform the user. For example, an audible alert may accompany the appearance of a list of popularity ratings.

The monitoring of experiences 10, generating the popularity ratings 12, and communicating at least one popularity rating 14 may be performed at substantially the same time. For example, the experiences may be continuously monitored. The popularity ratings may be continuously generated or updated in response to the monitoring. The updated popularity ratings may be communicated to users as soon as they are generated. Thus, although there may be some time delay due to the monitoring 10, generating 12, and communicating 14, the popularity ratings may be communicated to the users in 14 at such a rate that the popularity rating appears to be a real time indication of the present popularity ratings. In particular, the popularity ratings may be communicated to the user during the time period that the user is experiencing a program associated with the popularity rating.

In one embodiment, the programs are television programs. The monitoring of experiences in 10 is monitoring the viewing of the television programs. This monitored information is used to generate popularity ratings associated with the television programs in 12. Then the popularity ratings may be communicated to the users through their televisions in 14.

For a user to be able to engage in discussions of a program, the user may need to experience the program, or at least a portion of the program. Thus, a popularity rating may be communicated to a user at least as early as an end of a program associated with the popularity rating. As a result, the user may experience at least some portion of the program. In particular, if the program is the most popular program, the user may wish to experience a portion of the program in order to engage in discussions of the program. For example, a user may be watching a particularly comical rerun of "Gilligan's Island". However, if a new episode of "Survivor" is the most popular program, the user may be informed ten minutes before the end of the episode of "Survivor" so that the user may tune in and learn who was eliminated from the competition. Thus, the user will be able to discuss the most popular program, while still having enjoyed the user's chosen program.

Although a particular time before the end of a program has been described as a time to inform the user of a popularity rating, any time before the end of the program may be used. If a finale of a crime drama program typically occurs in the last five minutes of the program, the user may be informed five minutes before the end of the crime drama program. Any such time period may be used.

Furthermore, the time period may be determined in a variety of ways. The time period may be a user configurable setting. Thus, a user may want to be informed ten minutes before the end of any popular program. Alternatively, the time period may be based on the genre, commercial periods, typical content, or any other aspect of the program. Furthermore, the time period may be determined using a combination of user settings and aspects of the program.

In addition, the popularity rating may be communicated before an end of a rebroadcast or rerun of the associated program. Thus, even if a user decides not to watch the popular program at a particular time, the user may still watch the program at a later time and be prepared for discussions of the program.

A group of popularity ratings may be requested. This request may be by a user, or may be automatically requested by a device presenting the program. For example, a user may want to know what the most popular reality television program is currently. To determine this, the user may request the group of popularity ratings of reality television programs. In another example, a user may change the device to experience a new program. In response, the device may request popularity ratings of a group of programs including the new program. Regardless of the method of requesting, the group of popularity ratings may then be communicated to the user.

As described above, popularity ratings may be placed into groups. Such groups may be based on categories such as geographic location, user demographics, user interests, and user defined groups. For example, geographic location may include street, neighborhood, city, state, country, continent, or any other geographic granularity. User demographics may include any characteristic that may be used to classify a user. For example, such characteristics may include age, gender, familial status, favorite color, favorite food, name, profession, magazine subscriptions, etc. User interests may include characteristics of programs that appeal to a user. For example, user interests may include program genre, production date, cast, director, studio, length, aspect ratio, language, additional content, closed caption support, etc. Any of the above described groups may be further refined by specifying additional details. For example, groups based on names may be refined into groups based on names beginning with the letter 'K'.

User definable groups may include any of the above described groups or combinations of the groups. For example, a group of popularity ratings indicating the popularity for people between 18 and 35 years old may be further divided by other criteria into people between 18 and 35 years old that have lived in California during a major earthquake. Any such combination is possible. In addition, user definable groups may also include a list of specific people, for example, a buddy list, a list of co-workers, a list of relatives, a list of friends, or any other lists of specific people.

Groups of popularity ratings may be dynamically created and updated. Popularity ratings within a group may change over time. For example, a new program may be added to a lineup. New popularity ratings may be added to groups or existing popularity ratings may be modified with the addition of the new program. Such a change may be communicated so that the user may be made aware of the change.

As described above, a user may wish to keep track of the popularity rating of a program the user is experiencing. To accomplish this, the popularity rating associated with the program may be requested. This popularity rating is then communicated to the user. Thus, the user may stay informed of the popularity of the program the user is experiencing. As described above, the request for the popularity rating may be by the user, or may be performed automatically.

Although a request for one popularity rating has been described, any number of popularity ratings may be requested. For example, all of the popularity ratings of a particular group may be requested. Furthermore, every available popularity rating may be requested.

As described above, a user may want to be aware of the most popular program or programs so that the user may experience the highly popular programs. To achieve this, a group of popularity ratings higher than other popularity ratings may be communicated to the user. For example, a user may want to watch a situational comedy program. However, at a given time, many situational comedies may be available. To aid in the decision, the user may receive the five most popular situational comedies at that time. This group of the top five may be selected from the entire group of situational comedies. Thus, the user may see an appealing situational comedy from the group of popularity ratings and tune to that program.

To determine the popularity ratings, various parameters may be monitored. For example, a change to a particular channel may be used to increase a popularity rating associated with a program currently broadcast on that channel.

In addition, the time a user experiences a program may be used to change associated popularity ratings. For example, if a user experiences a program for a predefined time, associated popularity ratings may be increased. The measurement of the time period need not be continuous. The time period may represent the cumulative time that a user experiences a program during a measurement time period. For example, if a user switches back and forth between various programs, the time that the user spends experiencing each program may be recorded. If during the measurement time period, the cumulative time that the user experiences one of the programs is greater than a threshold value, the popularity rating associated with that program may be increased. Thus, even though the user has changed programs during the monitor time period, where no one contiguous time period exceeded the threshold, the popularity may still be increased if the cumulative time exceeded the threshold.

Furthermore, a personal video recorders (PVR) or digital video recorders (DVR) have become popular for recording programs for later use. Users may select programs they wish to record in a variety of ways. The recorded programs may be presented to the user at a later time. Monitoring the experiences of users may include monitoring various aspects of the usage of PVRs or DVRs. For example, the programs selected to be recorded may be used to indicate popularity. In addition, whether or not a user experiences a particular recorded program may be used to indicate popularity. Although PVRs and DVRs have been described, any device that may record and play back programs may be monitored to provide information concerning the experiences of users.

In addition, hysteresis may be used when changing popularity ratings. Thus, momentary changes in program selection may not affect associated popularity ratings. For example, if a time a user spends away from a particular program does not exceed a threshold, the user may still be considered as experiencing the program in order to affect the popularity rating. For example, if a television viewer changes the channel to check on a program on another channel, yet returns to the original channel shortly after, that channel change may not affect popularity ratings associated with a program on the original channel.

Devices that may present programs may not be able to tune to the program within the device. An external device may be needed to tune to the program. For example, a HDTV-ready television may not have a built in HDTV tuner. An external tuner may be used to convert a broadcast HDTV program into a signal that the HDTV-ready television may display. As a result, some devices may not be aware of the channel of the program or other tuning information.

However, the device may still be able to identify the program so that associated popularity ratings may be modified. Typically, additional information is transmitted along with programs that may or may not be included in the presentation of the program. For example, a television broadcast may include closed caption information. A DVD program may have multiple audio tracks. Any such additional information may be extracted from the program itself, or information associated with the program.

This extracted information may be used in the generation of the popularity ratings. For example, the identity of the program may be deduced by examining the extracted information. Thus, popularity ratings associated with the identified program may be adjusted in response to the user's experience of that program.

A popularity rating associated with a program may be based on the popularity of that program at an earlier time. When a program begins, there may be little to no information on the popularity of that program. Over time, the monitoring of the users' experience of the program may adjust the popularity rating. However, at the beginning of the program, the popularity rating may fluctuate considerable due to a variety of factors. For example, many programs begin at the same time. Users may switch back and forth between programs before deciding on a program to experience. The current popularity ratings may be affected by such indecision.

In one embodiment, the popularity rating may be initialized with the same popularity rating from an earlier time period. Over a time period, the source of information for the popularity rating may be both the earlier popularity rating and the monitored experiences. Gradually the generation may transition to wholly generate the popularity rating from the monitored experiences. As a result, fluctuations due to users deciding on a program may be reduced.

Alternatively, a user may prefer to see the instantaneous popularity rating with little or no effect from the earlier popularity rating. As a result, the user may monitor the change in one or more popularity ratings. For example, a user may see a trend in the popularity ratings indicating that a first program is becoming less popular, and a second program is becoming more popular. By prospectively making a decision to experience a particular program before that program becomes the most popular, a user may experience earlier moments in the program, giving the user more information concerning the program to be used in subsequent discussions of the program.

Occasionally, a user may prefer to make a selection of a program to experience based on the popularity of potential programs when those programs were previously presented. To accomplish this, the user may request popularity ratings for programs that were generated in the past. The user may then use the past popularity ratings to make the decision to experience a particular program.

Such previous popularity ratings may be presented to the user in a variety of ways. For example the user may browse programs through an electronic program guide. The electronic program guide may indicate the previous popularity rating in an entry for a program.

Alternatively, the past popularity ratings may be presented according to groups as described above. For example, a user may browse through a menu structure listing the past popularity ratings according to their inclusion in groups. Thus, a user may navigate through the groups to isolate groups in which the user may be included, or groups associated with the user's colleagues so that the user is more likely to experience a program that may lead to discussion within a social group.

Furthermore, both past and current popularity ratings for a program may be presented to the user simultaneously. Using this method, the user could see how popular the program was in the past, and simultaneously, how popular the current showing of the program is. This allows the user determine if a show is likely to be popular, while also providing the user with a completely real-time measurement of the program's current popularity.

The popularity listing may be further organized according to time based categories. For example, the past popularity ratings may be presented according to time of day, day of week, month, year, phase of the moon, astronomical events, holidays, political events, or any other parameter that may distinguish time. Thus, a user may see that on Friday night, 60 Minutes is the most popular television program. However, during a full moon at high tide, the most popular program was an ocean based movie such as "Jaws" or "Waterworld". As a result, the user may select the movie instead of 60 Minutes.

In addition, past popularity ratings of future programs may be used to present program selections or suggestions for the user. For example, at 7:55 p.m., a user may be presented with popularity ratings associated with upcoming programs beginning at 8:00 p.m. These programs may have the highest past popularity ratings for programs beginning at that time. In addition, programs occurring a greater time into the future may be presented to the user.

A popularity rating may be of interest to a user if the popularity rating changes a sufficient amount. If a popularity rating passes some threshold, the user may be informed of the occurrence. For example, if a popularity rating associated with a program a user is currently experiencing becomes more or less popular, the user may want to be informed. If the current program has dropped in popularity, the user may want to change programs. If the program has risen in popularity, the user may want to pay more attention to be able to eloquently discuss the program with colleagues.

Communicating the popularity rating to the user may include presenting a new program as a secondary presentation. For example, if a popularity rating associated with a program the user is not currently experiencing passes a threshold, that program may be presented to the user as the secondary presentation. A television may have the capability to display a second program on the main screen. Such a capability is commonly referred to as a picture-in-picture (PIP) display. A new television program may be displayed in the PIP display area to communicate to the user the change in the popularity rating.

As described above, popularity ratings may be organized into groups. When an individual popularity rating passes a threshold, a group containing the popularity rating may have increased interest for a user. As a result, the group containing the popularity rating may be communicated to the user. For example, if a popularity rating associated with a program a user is currently experiencing decreases below a threshold, the user may be informed of popularity ratings of programs within the same or similar genres. Thus, the user may change the program to a more popular program.

In addition, trigger levels may be based on time. For example, a popularity rating presentation may be triggered when time has passed the half hour mark. Thus, halfway through programs that may be one hour long, the user is informed of the popularity ratings within a group. This group may contain the currently presented program. Alternatively, the group may be the most popular programs.

With any method or system that automatically informs a user of something, if the information is conveyed at an annoying or inappropriate time, users may not use or avoid using the method or system. This may result in commercial failure of the system. However, the popularity rating may be communicated to a user at a time when a predicted increase in the annoyance level of a user is a relative minimum. For example, if the user is watching an action movie, an abundance of noises from explosions, gunfire, and yelling may indicate an exciting moment. Alternatively, during a romantic movie, soft musical tones and an absence of voices may indicate a passionate moment. A user may be highly annoyed if a display with popularity ratings appeared during such times. However, when such indicators are reduced, the user may be more agreeable to viewing popularity ratings. Thus, the currently presented program may be monitored to determine a time to present popularity ratings to the user.

Programs may be suggested to a user based on popularity ratings. As described above, the user may want to switch to a more popular program to increase the potential interaction within a social group. Thus, popularity ratings having the highest popularity may be presented to the user so the user may make the decision to change to a more popular program.

However, the most popular program may be a type that the user does not wish to experience. A group of popularity ratings associated with programs that the user may want to experience may be presented. The determination of what the user may want to experience may be based on the previous experience history of that user. For example, if a user has watched several mystery programs in the past week, a group of popularity ratings associated with mystery programs may be presented. Within this group the most popular programs may be presented. Thus, the user may select one of the most popular programs within a group that interests the user. Alternatively, the user may define groups of popularity ratings that interest the user. Thus, popularity ratings within the user defined group may be presented to the user.

Figure 2:
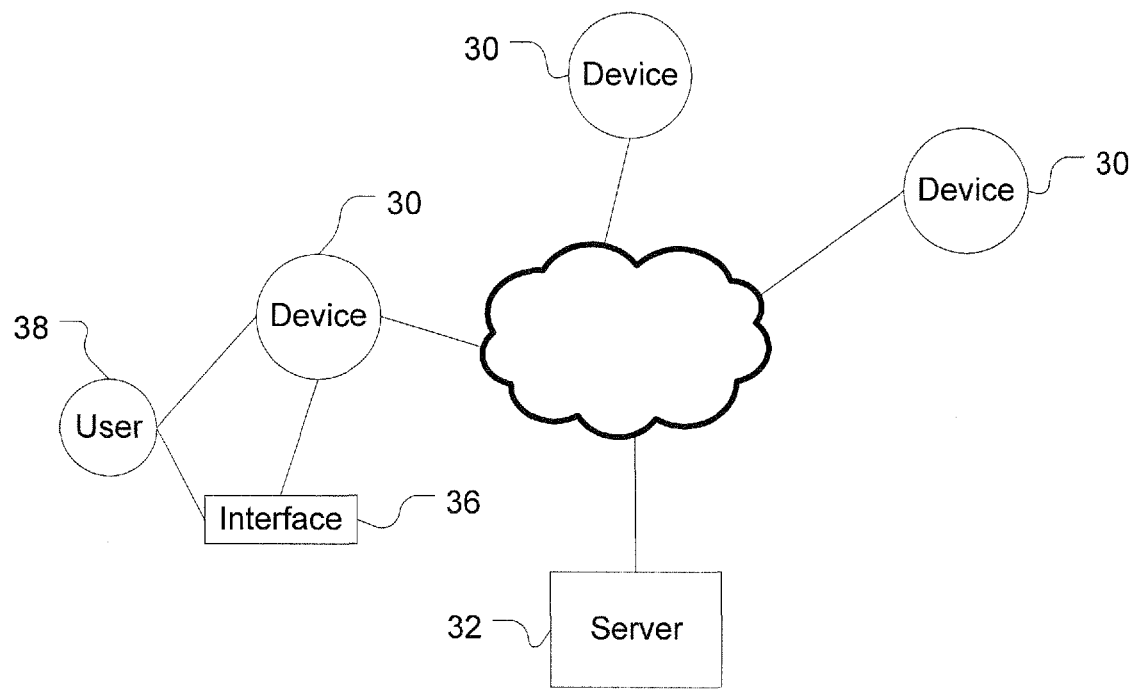
FIG. 2 is a block diagram of an embodiment of a system for providing popularity ratings to users.

FIG. 2 is a block diagram of an embodiment of a system for providing popularity ratings to users. The system includes multiple devices 30, a server 32, and a popularity rating interface 36. The devices 30 provide programs to users and generate user experience data. The server 32 generates popularity ratings associated with the programs in response to the user experience information. The popularity rating interface 36 provides popularity ratings to a user 38.

The device 30 is able to present programs to a user 38. It can also monitor the experience of a user 38 to generate the user experience data. The device 30 may communicate the user experience data to the server 32.

The server 32 uses the user experience data to generate popularity ratings for the programs associated with the user experience data. The server 32 may receive communications from one or more of the devices 30 the user experience data from. Alternatively, the server 32 may collect the user experience data from the devices 30. One of ordinary skill in the art will understand that any communication method may be used to communicate the user experience data to the server 32.

In one embodiment, the device 30 may be a television. The popularity rating interface 36 may include on screen menus of the television. Through the on screen menus, the user 38 would be able to browse popularity ratings, set preferences for the display of popularity ratings, organize groups of popularity ratings, or otherwise manipulate settings relating to popularity ratings through the popularity rating interface 36.

In another embodiment, a remote control of the device 30 may have an interface such as a button, jog wheel, etc. that would act as part of the popularity rating interface 36 to the popularity ratings and settings affecting the popularity rating interface 36.

As described above, popularity ratings may be communicated to the user 38 automatically. The device 30 may automatically request the popularity ratings from the server 32. The request may be in response to a variety of conditions. For example, the request may be made when the device 30 is powered on, when the device 30 is connected to a network, or any other condition that may indicate that a request for popularity ratings should be made.

Figure 3:
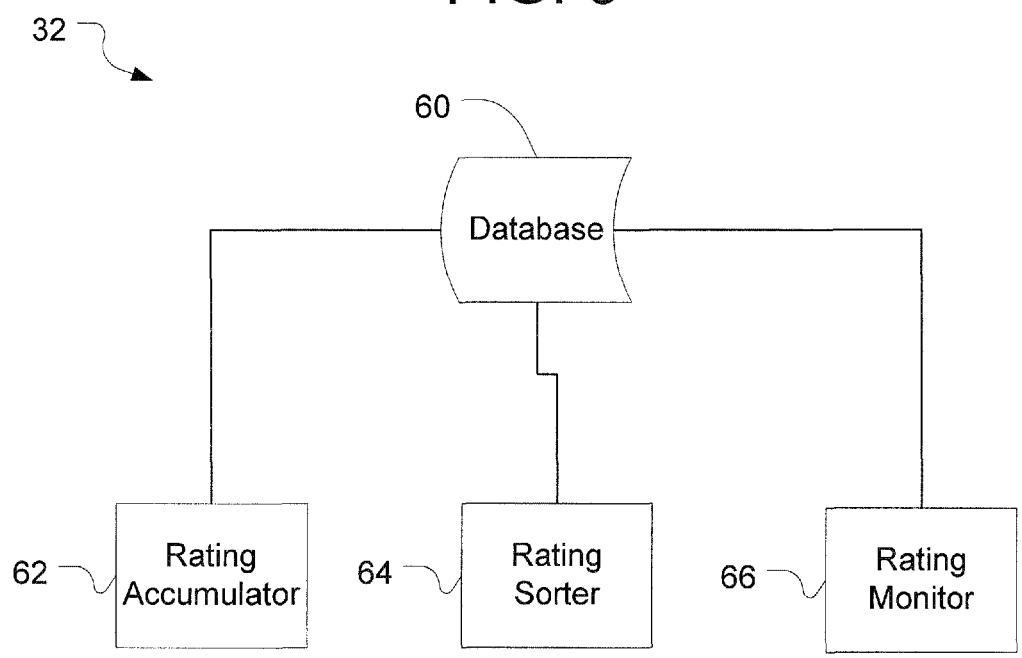
FIG. 3 is a block diagram of an embodiment of a server for generating popularity ratings.

FIG. 3 is a block diagram of an embodiment of a server for generating popularity ratings. The server 32 may include a popularity rating database 60, a popularity rating accumulator 62, a popularity rating sorter 64, and a popularity rating monitor 66. The popularity rating accumulator 62 updates the popularity rating database 60 in response to the user experience data. The popularity rating sorter 64 groups the popularity ratings into multiple groups of popularity ratings. The popularity rating monitor 66 monitors the popularity ratings in the popularity rating database.

The server 32 may be a single computing device, a collection of computing devices, or even a distributed function contained in other system components such as the viewing or data gathering devices. Many server and distributed computing architectures and combinations of architectures are possible.

The popularity rating sorter 64 groups the popularity ratings into groups. The grouping may be in response to identifying data associated with the user experience data. The popularity rating sorter 64 may work in conjunction with the popularity rating accumulator 62. For example, the combination may collect the user experience data and apply changes according to the popularity rating sorter 64. The popularity rating sorter 64 may organize the popularity ratings into groups. As described above, popularity ratings may be organized into many different groups. However, not all groups need to be defined. The popularity rating sorter 64 may organize the popularity ratings into defined groups.

The popularity rating monitor 66 may monitor the popularity ratings in the popularity rating database. Such monitoring may include determining if a popularity rating has passed a threshold. As described above, popularity ratings may be communicated to users if a popularity rating passes a threshold. To accomplish this, the popularity rating monitor 66 determines if a popularity rating has passed the threshold and causes the server 32 to communicate associated popularity ratings to at least one of the devices 30.

Figure 4:
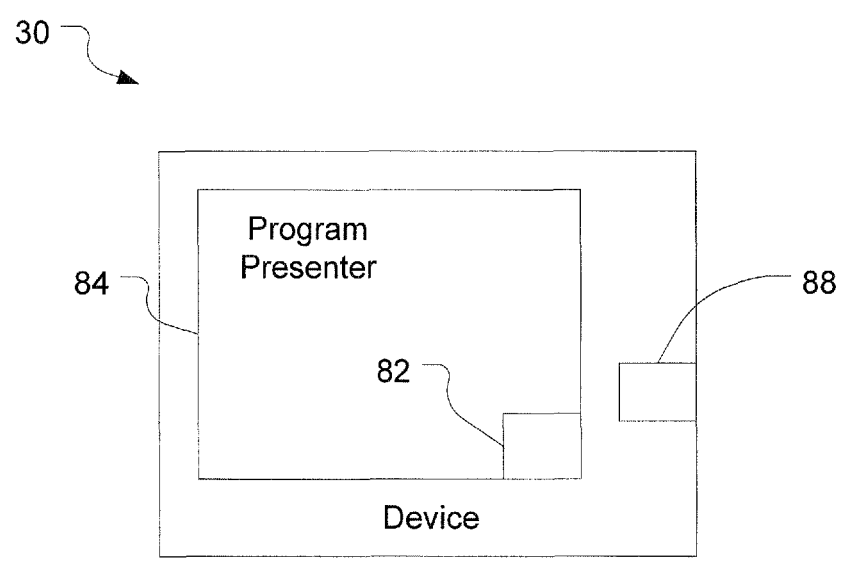
FIG. 4 is a block diagram of an embodiment of a device for presenting programs to users.

FIG. 4 is a block diagram of an embodiment of a device for presenting programs to users. The device 30 may include a program presenter 84, a popularity rating interface 82, and a network connection 88. The program presenter 84 presents a program to a user of the device 30. The popularity rating interface 82 indicates the popularity of programs among multiple users 38. The network connection 88 connects the device 30 to a popularity database. For example the popularity database may be the popularity database 60 of a server 32 of FIG. 3. The network connection 88 may be any type of connection that allows communication between a device 30 and a popularity database.

The program presenter 84 may present programs in a variety of media. For example, the program presenter 84 may present audio programs, video programs, or other programs presented to the user 38 through the user's senses.

The popularity rating interface 82 presents popularity ratings to the user. In addition, the popularity rating interface 82 may allow the user to configure the interaction of the device 30 and the popularity database. As described above, the user may create and modify groups of popularity ratings, set thresholds for popularity ratings, configure the presentation of any popularity ratings, or control any other aspect of the exchange of user experience data and popularity ratings. Any such control may be implemented through the popularity rating interface 82.

The popularity rating interface 82 may include an indicator that indicates that a popularity rating has changed. Such an indicator may be an audible indicator, a visual indicator, an updating popularity rating presentation, or any other indicator that may communicate to the user that a popularity rating has changed.

The indicator may be in the medium of the program presented by the program presenter 84. For example, on a television display, the indicator may be an icon or window that appears on the display. The television may generate a tone or other audible indicator to indicate a popularity rating change. Alternatively, the indicator may be in a different medium. For example, a visual indicator on a front panel of a radio presenting an audio program may indicate a popularity rating change.

Although the popularity rating interface 82 is illustrated as within the program presenter 84, the popularity rating interface 82 may be separate from both the program presenter 84 and the network connection 88. The popularity rating interface 82 may have its own network connection (not shown) to communicate popularity ratings. An example of such a popularity rating interface is a remote control that can present popularity ratings to the user. The remote control may have all of the presentation and interface functionality needed to allow a user to receive the popularity ratings and configure the popularity rating interface.

The popularity rating interface 82 may allow for control of the device 30. For example, as described above, the popular programs or associated popularity ratings may be communicated to the user. If this communication appears on the popularity rating interface 82, the user may select one of the suggested programs or popularity ratings. In response to the selection on the popularity rating interface, the program presenter 84 may change to present the selected program.

Other control of the device 82 may be available through the popularity rating interface. For example, the popularity rating interface 82 may include access to controls for the program presenter 84. Such controls may include video controls, audio controls, or other controls associated with the medium of the program presenter 84.

The device 30 may include a parameter monitor (not shown) to monitor user controllable parameters of the device. As described above various parameters of a device may indicate the interest of the user in the program presented by the program presenter 84. The parameter monitor may monitor at least one of these parameters and transmit the information to the popularity rating database.

As described above, some devices 30 may present programs that are not identified by a setting of the device 30 that may be monitored, but rather may be identified from ancillary information received from a connected device. An example is a television that is presenting a movie from a DVD player or a pay-per-view (PPV) movie received via a satellite set-top-box.

The device 30 may include an identifying data extractor (not shown) to extract identifying data from the program. As described above, programs frequently have additional content that is delivered to the user, but may not be presented to the user. The identifying data extractor may examine this additional content to identify the program with more specificity. Even if the program has no additional content, the identifying data extractor may examine the program itself to extract identifying data. This identifying data may then be transmitted to the popularity rating database.

Using the system to measure the popularity of programs received from connected devices is useful for determining the popularity of currently available programs identified by the ancillary information as described above. For example, a user may view the popularity ratings associated with DVDs or PPV movies. The user could then decide to rent a popular DVD or purchase the PPV movie.

The device 30 may include a program monitor (not shown) that may determine a time within a presentation of a program, an expected annoyance of the user is reduced. As described above, it is desirable to annoy the user as little as possible. The program monitor may monitor various aspects of the program to determine the potential interest of the user in the program content. For example, the program monitor may monitor audio portions of the program such as sound levels, audio frequency spectrums, voice patterns, etc. The program may monitor video portions of the program to determine if the program was interrupted by a commercial. In such a state when the program monitor determines that the annoyance of a user would be reduced, the popularity rating interface 82 may provide popularity ratings to the user.

Although some examples of aspects of a program used to determine an expected annoyance of a user have been described, one of ordinary skill in the art will understand that other aspects of a program may be monitored and associated with a user's interest to determine an expected annoyance of the user.

As described above, popularity ratings may be communicated to a user if a popularity rating passes a threshold. The popularity rating interface 82 may determine if a popularity rating has passed a threshold. In response, the popularity rating interface may provide a group of popularity ratings to the user. The popularity rating that passed the threshold may be part of the group of popularity ratings provided to the user.

Furthermore, the popularity rating interface 82 may monitor programs, popularity ratings, events, or other potential triggers to determine if popularity ratings should be provided to the user. For example, as described above, popularity ratings may be provided to a user at a half-hour mark. The popularity rating interface 82 may monitor time and determine if the popularity ratings should be presented to the user.

Some interfaces for devices 30 may be limited in functionality. For example, a typical television may only have a few buttons or controls to change settings. As a result, the configuration of a device 30 may be cumbersome, particularly for a large amount of user defined groups or thresholds. However, the user may enter user defined groups on a different device, perhaps having a keyboard or other interface, making the entry of groups easier. The user may enter the group selections and have the new user defined groups transmitted to the device. Such transmission may be directly to the device. The network interface 88 may receive updates to modify the configuration of the device 30. For example, the network interface 88 may receive a popularity rating group update. This popularity rating group update would be used to update popularity rating groups on the device 30.

Alternatively, the transmission may be by way of an intermediary. For example, the user defined groups may be transmitted to the popularity rating database. Then, during a subsequent communication between the device and the popularity rating database, the popularity rating database may communicate the updated user defined groups.

Although devices have been described as being televisions and users have been described as using televisions or experience television programs, one of ordinary skill in the art will understand that such devices are not limited to televisions. For example, such devices may include computers, cellular phones, personal data assistants (PDA), radios, or any other device capable of presenting a program in a medium.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A method comprising: monitoring a television presentation control device to detect a user interaction with a first media item, wherein the monitoring includes detecting first command data configured to change at least one user controllable device presentation parameter to modify a presentation of the first media item wherein the presentation of the first media item is ongoing and the controllable device parameter is independent of a channel change command and data corresponding to identification of a channel, wherein the at least one user controllable device parameter is controllable by the television presentation control device;

inferring an approval level corresponding to the first media item based on the user interaction to generate first approval data based on the inferred approval level;

compiling the first approval data with second approval data corresponding to second command data associated with the first or a second media item, or combinations thereof playing on one or more other devices;

generating an approval rating corresponding to the first media item or the second media item, or combinations thereof;

automatically changing the approval rating corresponding to the first media item based on the user interaction, wherein the one or more approval ratings increase relative to an amount of time the associated programs play out on a corresponding device as indicated by the user interaction, and wherein the one or more approval ratings decrease based on command data indicating that during presentation of the associated programs a user decreased the volume;

communicating the approval rating to the device;

receiving a user defined list from the device comprising a sub-group selected from a group of people sharing a common demographic associated with age, geographic location, gender, profession, programming taste, or familial status, or combinations thereof;

receiving a request for a list of past and current approval ratings corresponding to the user defined list; and communicating the past and current approval ratings to the user for displaying on a user device wherein the past and current approval ratings correspond to the user defined list.

2. The method of claim 1, wherein communicating the approval rating comprises a real time approval rating indicating current approval ratings corresponding to the first media item or the second media item, or combinations thereof.

3. The method of claim 1, wherein the first media item comprises a program selected from: a television program, an internet program, a broadcast radio program, an on-demand radio program, a music CD program, or a DVD program.

4. The method of claim 2, wherein the approval rating includes a partial program approval rating, a program episode approval rating, a program series approval rating, a program genre approval rating, or combinations thereof.

5. The method of claim 2, further comprising sending a group of approval ratings to the device when the approval rating of the first media item that is currently playing falls below a first predetermined threshold, and wherein group members of the group each have an approval rating greater than that of the first media item that is currently playing.

6. The method of claim 1, further comprising increasing the approval rating of the first media item concurrent with the device playing the first media item based on at least one of: the device playing the first media item for a predefined time period, the device recording the first media item, increasing a sound volume of the first media item or changing a color setting for a display associated with the device.

7. The method of claim 2, further comprising:
    extracting identifying data from the first media item through the device.

8. The method of claim 1, wherein the controllable device parameter is accessible via a record button, a volume button, or combinations thereof.

9. The method of claim 2, further comprising sending the user a message recommending a program when an approval rating exceeds a second predetermined threshold, wherein the second predetermined threshold is configured to be set by the user.

10. The method of claim 9, wherein the message is an on-screen popup message in a form of a chart, a graph, a ticker, a symbol, an icon, or text.

11. The method of claim 2, wherein said communicating is configured to occur at a time when a predicted increase in an annoyance level of the user is at a relative minimum, and wherein the annoyance level is based, at least in part, on an audio spectrum of the first media item that is currently playing on the device.

12. A system comprising:
    a plurality of devices configured to play a plurality of associated programs and to update user experience data, wherein the user experience data includes command data configured for changing at least one user controllable device parameter associated with at least one device of the plurality of devices and for modifying a presentation of a particular one of the plurality of associated programs wherein the presentation of the particular one of the associated programs is ongoing and the controllable device parameter is independent of a channel change command and data corresponding to identification of a channel during presentation of the particular program by changing the at least one user controllable device parameter, wherein the at least one device is a television;

a server configured to receive updated user experience data and to generate one or more popularity ratings associated with the plurality of programs in response to receiving the updated user experience data wherein the one or more popularity ratings increase relative to an amount of time the associated programs play out on a corresponding device as indicated by the user experience data and wherein the one or more popularity ratings decrease based on command data indicating that during presentation of the associated programs a user decreased the volume;

a program identifying unit to extract identifying information from a program of the associated programs, wherein the at least one device is configured to include identifying information in the user experience data;

a popularity rating interface to provide the one or more popularity ratings to the at least one device;

the server also configured to receive a user defined list of users and receive a request for a list of past and current popularity ratings corresponding to the user defined list; and the popularity rating interface also to provide the past and current approval ratings to the at least one device for display, wherein the past and current approval ratings correspond to the user defined list.

13. The system of claim 12, wherein the popularity rating interface is configured to provide the one or more popularity ratings concurrent with presenting the particular one of the plurality of associated programs in real time.

14. The system of claim 12, wherein the server further comprises:
    a popularity rating sorter to group the one or more popularity ratings into a plurality of popularity rating groups;
    a popularity rating monitor to monitor the one or more popularity ratings; and
    a program monitor to determine a time concurrent with the presentation of the particular one of the plurality of associated programs, an expected annoyance of the user is reduced, wherein the popularity rating interface is configured to display one or more of the plurality of popularity rating groups when the program monitor determines that the expected annoyance is reduced, and wherein the program monitor determines the expected annoyance of the user is reduced based on spectra of the particular one of the plurality of associated programs.

15. The system of claim 14, wherein the popularity rating sorter is configured to group the popularity ratings according to at least one of user geographical location, user demographics, user interest, and user-defined lists.

16. The system of claim 14, wherein the server is configured to transmit popularity ratings to the at least one device if the popularity rating monitor identifies that a popularity rating passes a threshold.

17. An apparatus, comprising: a device configured to present a program; an approval rating interface configured to:
   extract first identifying data from the program, wherein the identifying data is independent of channel tuning data and based on analysis of the program;
   transmit the identifying data to a server for use in generating approval ratings for the program, wherein approval ratings are based on detected command data configured to change at least one user controllable device presentation parameter to modify a presentation of the program wherein the presentation of the program is ongoing and the controllable device parameter is independent of a channel change command and data corresponding to identification of a channel;
   receive a user defined list of users;
   transmit the list to the server;
   receive approval ratings from the server corresponding to the program and to the user-defined list, wherein the approval ratings corresponding to the program are automatically changed by the server by increasing the approval ratings relative to an amount of time associated programs play out on a corresponding device and by decreasing the approval ratings based on command data indicating that during presentation of the associated programs a user decreased the volume;
   provide the approval ratings to the device;
   receiving a request for a list of past and current approval ratings corresponding to the user defined list;
   transmit the request to the server;
   communicating the past and current approval ratings to the user for displaying on a user device wherein the past and current approval ratings correspond to the user defined list;
   automatically send an alert if the approval ratings associated with the program surpasses a threshold rating;
   automatically sending an alert to the device indicating that a predetermined portion of a different program is currently playing; and
   a network connection configured to connect the device to an approval database, wherein the approval database is configured to store the approval ratings.

18. The apparatus of claim 17, wherein the approval rating interface further comprises an indicator configured to indicate an approval rating change.

19. The apparatus of claim 17, comprising:
   an approval rating program list creation interface configured to define a list of programs for which to provide the approval ratings.

20. The apparatus of claim 17, wherein:
   the device includes a display of a television; and
   the approval rating interface includes a portion of the display of the television.

21. The apparatus of claim 17, wherein the device is configured to change the first program in response to an input through the approval rating interface.

22. The apparatus of claim 17, comprising a parameter monitor configured to monitor second command data associated with modification of at least one user controllable parameter of the device concurrent with presentation of the first program on the device and to transmit monitored information to the approval database.

23. The apparatus of claim 17, comprising:
   a program monitor to determine a time concurrent with the presentation of the first media stream wherein a user annoyance level is at an expected minimum,
   wherein the approval rating interface is configured to provide the approval ratings to the device if the program monitor determines that the expected user annoyance level is at the expected minimum, and wherein the program monitor determines the user annoyance level based on an audio spectrum of the first media stream.

24. The apparatus of claim 17, wherein the approval rating interface is configured to determine if a particular approval rating of a group of approval ratings has surpassed a threshold rating, and to provide the group of approval ratings to the each user when the approval rating threshold has been surpassed.

25. The apparatus of claim 17, wherein a network interface is further configured to receive an approval rating group update, and wherein the approval rating interface is configured to update approval rating groups in response to the approval rating group update.

26. The system of claim 12, wherein the controllable device parameter is accessible via a plurality of controls including a record button, a volume button, a television channel, or combinations thereof.

27. The method of claim 10, wherein the popup message directly links the user to the recommended program.

* * * * *